(12) United States Patent
Kenkre et al.

(10) Patent No.: US 9,864,634 B2
(45) Date of Patent: Jan. 9, 2018

(54) ENHANCING INITIAL RESOURCE ALLOCATION MANAGEMENT TO PROVIDE ROBUST RECONFIGURATION

(75) Inventors: Sreyash D. Kenkre, Bangalore (IN); Sameep Mehta, New Delhi (IN); Krishnasuri Narayanam, Bangalore (IN); Vinayaka D. Pandit, Bangalore (IN); Soujanya Soni, New Delhi (IN)

(73) Assignee: International Business Machines Corporation, Armonk, NY (US)

( * ) Notice: Subject to any disclaimer, the term of this patent is extended or adjusted under 35 U.S.C. 154(b) by 1020 days.

(21) Appl. No.: 13/366,438

(22) Filed: Feb. 6, 2012

(65) Prior Publication Data

US 2013/0204983 A1 Aug. 8, 2013

(51) Int. Cl.
*G06F 15/177* (2006.01)
*G06F 9/50* (2006.01)

(52) U.S. Cl.
CPC ..................... *G06F 9/50* (2013.01)

(58) Field of Classification Search
USPC .................. 709/220, 223, 224, 225
See application file for complete search history.

(56) References Cited

U.S. PATENT DOCUMENTS

| | | | |
|---|---|---|---|
| 6,292,905 B1 | 9/2001 | Wallach et al. | |
| 7,516,455 B2 * | 4/2009 | Matheson et al. | 718/102 |
| 2002/0152305 A1 * | 10/2002 | Jackson et al. | 709/224 |
| 2005/0228850 A1 * | 10/2005 | Zhu et al. | 709/200 |
| 2006/0212332 A1 * | 9/2006 | Jackson | 705/8 |
| 2006/0212871 A1 | 9/2006 | Cook | |
| 2008/0091806 A1 * | 4/2008 | Shen et al. | 709/223 |
| 2009/0183168 A1 * | 7/2009 | Uchida | 718/104 |

OTHER PUBLICATIONS

Verma et al. "CosMig: Modeling the Impact of Reconfiguration in a Cloud". Issue date: Jul. 25-27, 2011; pp. 3-11, Location—Singapore; ISSN: 1526-7539.

Song Fu—"Failure-Aware Construction and Reconfiguration of Distributed Virtual Machines for High Availability Computing" Published in: Proceeding CCGRID '09 Proceedings of the 2009 9th IEEE/ACM International Symposium on Cluster Computing and the Grid.

* cited by examiner

*Primary Examiner* — Normin Abedin
(74) *Attorney, Agent, or Firm* — Maeve M. Carpenter

(57) ABSTRACT

A description of a resource associated with a service of an entity can be captured. The service can be associated with one or more resources, a constraint, and a demand. The resource can be associated with one or more characteristics including a utility, a limited availability, and a consumption rate. The entity can be an organization or a system. An initial allocation problem associated with the resource can be formulated as a two phase problem. The first phase can be an optimization problem and the second phase can be a restricted allocation problem. The initial allocation problem can be associated with reconfiguring a previously established allocation of a baseline scenario. The optimization problem can be solved optimally or approximately to establish a favorable allocation. The favorable allocation can minimizes the reconfiguration cost of the reconfiguring. The baseline scenario can be a normal operation of the service.

20 Claims, 3 Drawing Sheets

ENHANCING INITIAL RESOURCE ALLOCATION MANAGEMENT TO PROVIDE ROBUST RECONFIGURATION

BACKGROUND

The present invention relates to the field of resource management and, more particularly, to enhancing initial resource allocation management to provide robust reconfiguration.

In many industries, management of resources can be critical to operations and success within the industry. Traditional approaches to resource management can include a configuration phase and a contingency planning phase. That is, resource management procedures can establish resource configurations which permit the operation of a resource in normal conditions and in adverse conditions. For example, when a new project is created, resources can be allocated (e.g., configuration phase) and a contingency plan (e.g., contingency planning phase) can be established after the allocation is performed. Contingency planning phase often produces a contingency plan which can direct the reconfiguration of the service during a contingency occurrence (e.g., network outage). Frequently, a service can be unable to be reconfigured due to infeasibility of a contingency plan when a contingency occurs. For example, a contingency plan can require reliance on an outside resource which can be unavailable during a network outage. Consequently, traditional approaches to resource management can result in suboptimal performance due to decoupling of these two phases.

Further, contingency plans can often require high reconfiguration costs which can negatively impact service availability and performance. That is, since the contingency planning can be done after the configuration of the service, resource constraints of the service can often conflict. Conflicts such as resource overloading, geographical constraints, and human resource issues can prevent contingency plans to be enacted easily.

In worst case scenarios, resources of a service can be allocated without planning for contingencies. This can be attributed to the high complexity and time consuming nature of contingency planning. When these worst case scenarios occur, disruption of service and/or service outages can be realized as a result of insufficient resource availability. For example, when an e-commerce Web site server fails and the server is not associated with a reconfiguration scenario, the Web site can be unavailable for extended periods of time. That is, failure to develop reconfiguration scenario can negatively impact resource availability, usage, and cost which can be detrimental to operations of an organization.

BRIEF SUMMARY

One aspect of the present invention can include a system, a computer program product, an apparatus, and a method for enhancing initial resource allocation management to provide robust reconfiguration. A description of a resource associated with a service of an entity can be captured. The service can be associated with one or more resources, a constraint, and a demand. The resource can be associated with one or more characteristics including a utility, a limited availability, and a consumption rate. The entity can be an organization or a system. An initial allocation problem associated with the resource can be formulated as a two phase problem. The first phase can be an optimization problem and the second phase can be a restricted allocation problem. The initial allocation problem can be associated with reconfiguring a previously established allocation of a baseline scenario. The optimization problem can be solved optimally or approximately to establish a favorable allocation. The favorable allocation can minimizes the reconfiguration cost of the reconfiguring. The baseline scenario can be a normal operation of the service.

Another aspect of the present invention can include, a computer program product, an apparatus, a method, and a system for enhancing initial resource allocation management to provide robust reconfiguration. A reconfiguration engine can be able to establish an initial allocation associated with a resource of a service. The initial allocation can be associated with a reconfiguration setting or a reconfiguration cost. The service can be associated with the resource, a constraint, or a demand. The resource can be associated with one or more characteristics. The characteristics can be a utility, a limited availability, and a consumption rate. The entity can be an organization or a system. A data store configured to persist a reconfiguration mapping or an action plan can be associated with the service.

DETAILED DESCRIPTION

Figure 1:
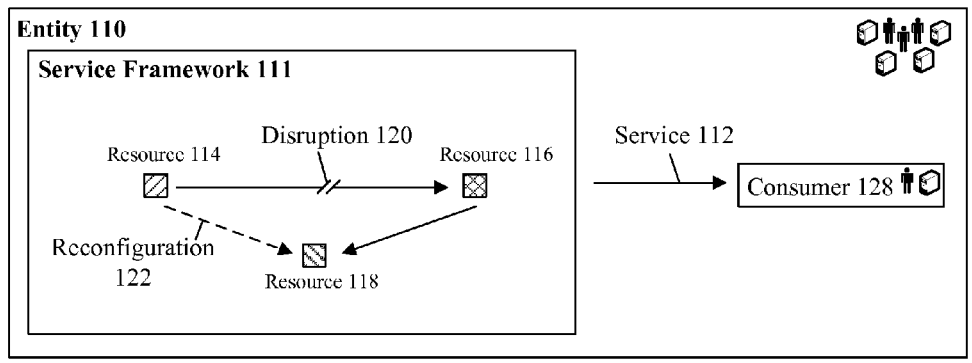
FIG. 1 is a schematic diagram illustrating an example for enhancing initial resource allocation management to provide robust reconfiguration in accordance with an embodiment of the inventive arrangements disclosed herein.
Figure 1:
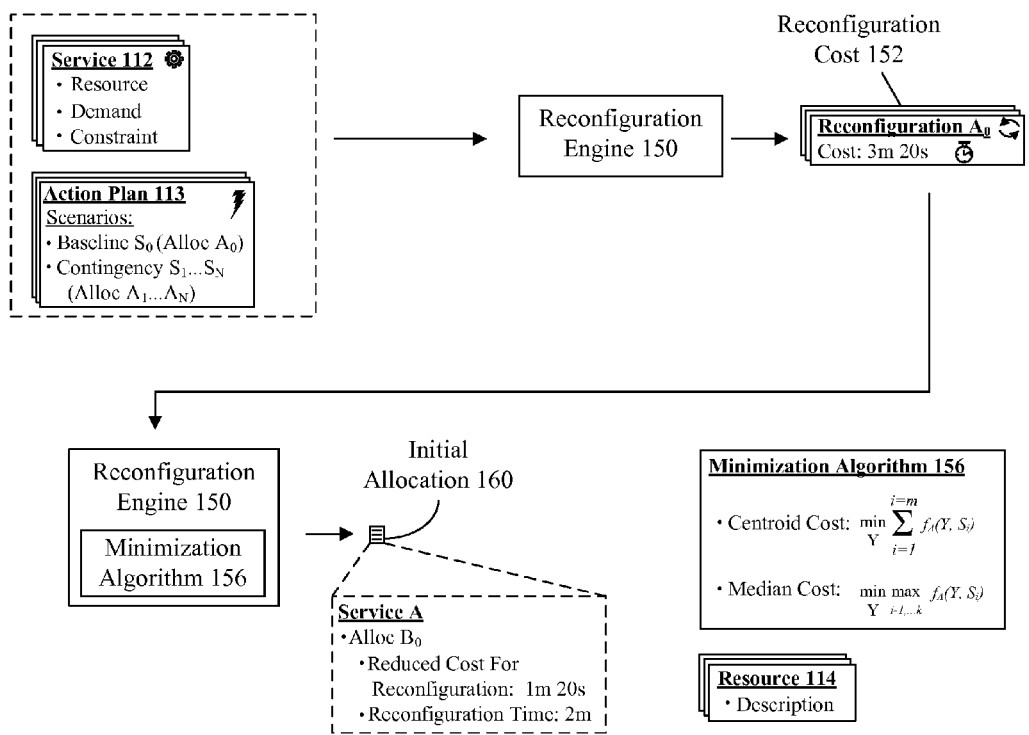

The present disclosure is a solution for enhancing initial resource allocation management to provide robust reconfiguration. In the solution, initial resource allocations for an entity can be automatically computed to produce optimal reconfiguration scenarios for that entity. Reconfiguration scenarios can provide reconfiguration actions which can be enacted to allow efficient use of resources during a period of entity/resource disruption. The reconfiguration scenarios can be created by formulating the initial allocation of the entity as a two phase process: an optimization phase and a restricted allocation phase. It should be appreciated that the disclosure can be employed to create reconfiguration scenarios for an entity when the explicit cost of reconfiguring the entity can be unknown. It should be understood that the disclosure can leverage organizational policies to develop reconfiguration scenarios without requiring development of new resource allocation mechanisms.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing. Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions.

These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

FIG. 1 is a schematic diagram illustrating an example 100, 180 for enhancing initial resource allocation management to provide robust reconfiguration in accordance with an embodiment of the inventive arrangements disclosed herein. Example 100, 180 can be present in the context of method 200, and/or system 300. In example 100, a service framework 111 within an entity (e.g., organization) can utilize resources 114-118 to provide service 112 to a consumer 128. For example, service 112 can be a Web service providing offsite data storage for a small business. A disruption 120 affecting resource 114 communication with resource 116 can result in a service 112 outage. That is, consumer 128 cannot utilize service 112 when a disruption 120 occurs. A reconfiguration action 122 can restore service 112 to consumer 128. In example 180, engine 150 can be utilized to reduce reconfiguration cost associated with a reconfiguration action 122. It should be appreciated that the disclosure can be employed to optimize reconfiguration costs for existing services and/or new services.

In example 100, action plan 113 can be utilized by framework 111 to perform reconfiguration 122 which can result in employing resource 118 when resource 116 is unavailable. Service 112 can be restored to consumer 128 when reconfiguration 122 occurs. Reconfiguration 122 can be associated with a reconfiguration cost which can be incurred to enable reconfiguration 122 to occur. For example, reconfiguration cost can be a network utilization overhead associated with a session initiation setup. Reconfiguration 122 can be performed utilizing action plan 113. For example, action plan 113 can specify to route communication normally conveyed to resource 116 to resource 118 during a disruption 120.

In example 180, a reconfiguration cost 152 associated with a reconfiguration 122 can be minimized utilizing reconfiguration engine 150. That is, the disclosure can permit a reconfiguration friendly initial allocation 160 for service 112 which can reduce reconfiguration costs associated with action plan 113. As used herein, a reconfiguration can be a change in configuration from a baseline scenario (e.g., Baseline $S_0$) to a different scenario (e.g., Contingency $S_1$). For example, a reconfiguration can be a change from a first allocation (e.g., Alloc $A_0$) to a different allocation (e.g., Alloc $A_1$).

Action plan 113 can be a resource management artifact for facilitating the reconfiguring of service 112 in accordance with a contingency scenario (e.g., Contingency $S_1 \ldots S_N$).

That is, action plan 113 can be utilized to reconfigure (e.g., reconfiguration 122) service framework 111 when a disruption 120 occurs. For example, action plan 113 can specify the allocation and/or acquisition of computing elements permitting resource 114-118 and/or service 112 to function in response to a network outage. Reconfiguration (e.g., reconfiguration 122) can include a cost (e.g., reconfiguration cost 152) such as a time cost required to perform reconfiguration 122. For example, reconfiguration 122 can require three minutes and twenty seconds to be executed to permit the continued availability of service 112. It should be appreciated that the disclosure can minimize the maximum cost and/or minimize the average cost of a reconfiguration.

In one embodiment, the disclosure can diminish "worst case" reconfiguration costs for services (e.g., service 112) and/or resources (e.g., resource 114-118). That is, the disclosure can enable efficient reconfigurations to occur during a disruption (e.g., disruption 120). For example, the disclosure can be utilized to improve existing resource leveling techniques associated with resource management processes.

It should be appreciated that the disclosure differs from conventional approaches which utilize probability distributions and/or robust optimization techniques to reduce expected cost. The disclosure can be aligned with the objectives of robust optimization but can leverage latent capabilities of a system (e.g., framework 111) to permit reconfiguration aware allocation.

In example 180, service 112 information and/or action plan 113 can be conveyed to reconfiguration engine. Engine 150 can analyze service 112 information and/or action plan 113 to determine reconfiguration cost 152 for each contingency (e.g., Contingency $S_1 \ldots S_N$) associated with the service 112. Service 112 can be a set of related software functionalities that can be reused for one or more purposes. Service 112 can be produced from service framework 111. Framework 111 can include one or more resources 114-118 which can be cooperatively utilized to generate service 112. Service 112 can include, but is not limited to, an desktop application service, a server functionality, a communication functionality, and the like. For example, service 112 can be a Web service for handling Session Initiated Protocol communication. Service 112 can include, but is not limited to, a resource, a demand, a constraint, and the like. For example, service 112 can identify one or more demand points (e.g., consumer 128) which require service 112 availability.

Action plan 113 can include, but is not limited to, a set of scenarios associated with allocations (e.g., Alloc $A_0$, Alloc $A_1 \ldots A_N$). For example, action plan 113 can be a disaster preparedness document of an organization. That is, each scenario can include allocation information for each baseline scenario (e.g., Baseline $S_0$) and/or contingency scenario (e.g., Contingency $S_1 \ldots S_N$). Allocation can represent a computer configuration which can be an arrangement of functional units according to the nature, number, and/or chief characteristics. Allocation can include, but is not limited to, a computer file, a service, a computing resource, a database record, and the like.

The reconfiguration cost 152 of service 112 from a baseline scenario (e.g., Baseline $S_0$) configuration to a contingency scenario configuration (e.g., Contingency $S_1$) can be computed. The configuration cost can include, but is not limited to, temporal cost, a resource cost, a human resource cost, a monetary cost, and the like. It should be appreciated that reconfiguration cost 152 can be previously computed and conveyed to engine 150 for usage. Costs 152 can be processed by a minimization algorithm 156 to produce an optimum initial allocation 160.

Initial allocation 160 can be a reconfiguration capable allocation of resources which can include, but is not limited to, an allocation associated with one or more resources (e.g., Alloc $B_0$), a metric, and the like. For example, initial allocation (e.g., Alloc $B_0$) can decrease reconfiguration time of a service 112 from three minutes twenty seconds (e.g., Alloc $A_0$) to two minutes resulting in a time savings of one minute twenty seconds. It should be appreciated that initial allocation 160 can enable reduced reconfiguration costs while permitting a minimum level of service to be maintained by service 112. In one embodiment, initial allocation 160 can be a portion of a reconfiguration mapping (e.g., reconfiguration mapping 342). In the embodiment, reconfiguration mapping can permit migration of a baseline allocation (e.g., Alloc $A_0$) to an initial allocation 160 (e.g., Alloc $B_0$).

In one embodiment, the disclosure can model the reconfiguration cost reduction as, a Centroid problem, a Median problem, and the like. In the embodiment, algorithm 156 can solve (optimally or approximately) an optimization problem associated with the reconfiguration cost to permit an optimal initial allocation 160 to be determined. It should be appreciated that the disclosure can obtain an optimum initial allocation 160 when reconfiguration costs is not explicitly known. In one instance, the disclosure can permit resources of a new service to be allocated (e.g., initial allocation 160) which can minimize reconfiguration costs.

Algorithm 154 can utilize service 112 characteristics (e.g., demand, constraint) and/or resource 114 information (e.g., description) to determine an initial allocation 160 for any resource 114-118 and/or service 112. It should be appreciated that the disclosure can be customizably granular. That is, the disclosure can be capable of optimizing configuration costs at the resource level, service level, enterprise level, and the like.

Algorithm 154 can establish k types of resources (e.g., resources 114-118) for an organization. For each resource of type i, can exist $N_i$ resources which can be denoted by $T(i,N_i)$ (e.g., $T(i, N_1)$, $T(i, N_2)$, etc). The service 112 can be specified by a k-tuple $D=(d_1, d_2, \ldots, d_k)$ and a set of constraints. The number $d_i$ can indicate the service requires $d_i$ units of type i resource which can include constraint C restricting which resource type i can be utilized. The service can be denoted by an ordered pair (D,C). For a given scenario S (e.g., baseline $A_0$, contingency $A_1$) and a service (D,C), an allocation procedure A. Procedure can assign the resources in S to (D,C) in accordance with organizational/service constraints. The output of A can be a mapping of the resources in S to the demands of D. When no mapping is possible, A can be utilized to indicate an infeasibility of assignment. The assignment procedure A can be manual and/or automated.

For example, Y can be a mapping of service (D,C) within a scenario $S_1$. In the example, a new scenario $S_2$ which require resources from S1 to be reassigned to $S_2$. A function $f\_A(Y, S_2)$ can be parameterized by the procedure A which can produce a cost of the reassignment. m scenarios $S_1$, $S_2, \ldots S_m$ can be established within the example, to correspond to a list of available resources in each scenario, where $S_0$ can be a scenario where all resources are available. In the example, the algorithm can find an allocation Y in scenario $S_0$ using procedure A which can minimize the cost of reallocation when any scenario $S_1, S_2, \ldots, S_m$ occurs. The algorithm 156 can perform a minimization of the maximum cost or a minimization of the average cost corresponding to a Centroid problem (e.g., Centroid cost) and a Median problem (e.g., Median cost). In one instance, when the cost function (e.g., f_A(. , . )) is unknown, the algorithm can determine an approximate the cost by the cardinality of Y\S$_i$ (e.g., the number of resources to be reallocated). In the instance the sum of the cost of reallocating each type of resource in Y\S$_i$ can yield the approximate cost for the function.

It should be appreciated that initial allocation 160 can be further optimized manually and/or automatically. In one instance, engine 150 can compute configuration costs of multiple baseline and/or contingency scenarios. In one configuration of the instance, engine 150 can compute the configuration cost required to change service 112 configuration from a contingency scenario (e.g., S$_2$) to another contingency scenario (e.g., S$_3$).

As used herein, resource management can be a one or more actions associated with the efficient and effective deployment of entities and/or resources within one or more organizations. Entity 110 can be an artifact including one or more resources 114-118 which can be consumed. Entity 110 can include, but is not limited to, an organization, a component, a legal entity, an object, and the like. For example, an entity 110 can be an enterprise computer system of a corporation. Entity can include, but is not limited to, an organization, a governmental entity, a corporation, and the like.

As used herein, resource 114-118 can include characteristics but is not limited to, a utility, a limited availability, and a consumption rate. Resource 114-118 can include, but is not limited to, an economic resource, a biological resource, a computer resource, a land management resource, a human resource, and the like. For example, resource 114-118 can be a Uniform Resource Identifier associated with a Web-enabled service. In one instance, resource 114-118 can be an aggregated resource with interdependencies. Resource 114-118 can be biotic, abiotic, renewable, non-renewable, potential, actual, and the like. For example, resource can be a group of personnel (e.g., police) associated with a planned city event.

Service 112 can be associated with one or more constraints which limit the availability and/or consumption. Constraints can include, but is not limited to, a temporal constraint, a cost constraint (e.g., monetary), a scope constraint, a geographic constraint, a legal constraint, an energy constraint, a human resource constraint, and the like.

Disruption 120 can include planned events and unplanned events. Disruption 120 can include, but is not limited to, maintenance events, repair events, natural disaster events, and the like. For example, disruption 120 can include a malfunction of one or more components (e.g., resource 116). It should be appreciated that minimum service level can refer to resource volume, resource number, and the like.

Drawings presented herein are for illustrative purposes only and should not be construed to limit the invention in any regard. It should be understood that, entity 110, framework 111, and/or resources 114-118 can be associated with dependencies. Dependencies can include, but is not limited to, a data dependency, a functional dependency, an interdependency, and the like. That is, the operation of a service 112 and/or resource 114-118 can be predicated on the availability and/or functioning of a different entity, service, or resource. In one instance, the disclosure can be utilized to facilitate a reduction in reconfiguration costs for project management and/or project planning activities. In the instance, initial resource allocation 160 can be optimized to reduce delays and over-allocation during a project execution when new project artifacts are introduced.

Figure 2:
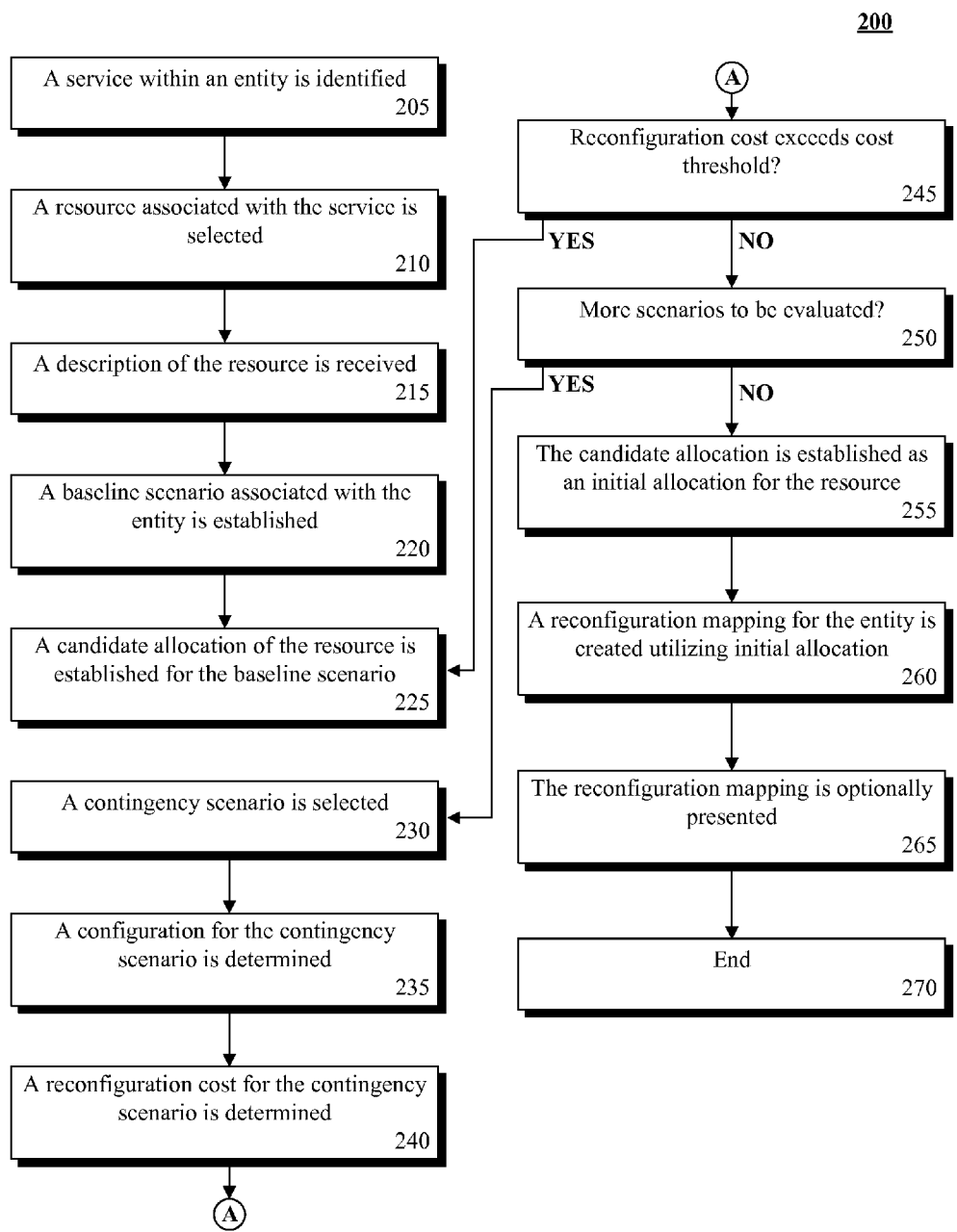
FIG. 2 is a schematic diagram illustrating a method for enhancing initial resource allocation management to provide robust reconfiguration in accordance with an embodiment of the inventive arrangements disclosed herein.

FIG. 2 is a schematic diagram illustrating a method 200 for enhancing initial resource allocation management to provide robust reconfiguration in accordance with an embodiment of the inventive arrangements disclosed herein. Method 200 can be performed in the context of example 100 and/or system 300. In method 200, an optimal initial allocation can be automatically determined for service to fulfill one or more contingency scenarios. In the method 200, a resource can be selected and a candidate allocation can be determined. The candidate allocation can be evaluated within contingency scenarios to determine reconfiguration cost. Based on reconfiguration costs, the candidate allocation can be determined to be optimal. The method can be repeated for each resource to establish an optimal initial allocation for each resource in the service. In one instance, the initial allocation of resources within service can be optimized further as an aggregate allocation.

In step 205, a service within an entity can be identified. The service can be identified automatically and/or manually. In one instance, the service can be identified based on performance characteristics. For example, if the service performed poorly historically, the service can be automatically selected for reconfiguration optimization. In step 210, a resource associated with the service can be selected. Resource selection can be automated and/or manually performed. Selection can be random or can follow an ordered selection process. For example, the selection process can include an alphabetical selection in which resources are selected in ascending order.

In step 215, a description of the resource can be received. The description can be analyzed to determine resource configuration and/or initial allocation. In one embodiment, the method 200 can optimize (e.g., fine tune) an existing initial allocation of a resource. In another instance, the method 200 can create a new initial allocation for a resource. In step 220, a baseline scenario associated with the entity can be established. The baseline scenario can be manually and/or automatically established. For example, the baseline scenario can be automatically select from a scenario planning document. In step 225, a candidate allocation of the resource can be established for the baseline scenario. The candidate allocation can be established utilizing one or more settings, initial allocations, historic allocations, and/or candidate allocations. In step 230, a contingency scenario can be selected. The contingency scenario can be selected based on reconfiguration cost (e.g., known costs), scenario priority, a random selection, and the like.

In step 235, a configuration for the contingency scenario is determined. The configuration can be determined based on resource operational requirements for the scenario. For example, a planning document can be analyzed to determine operational requirements. In step 240, a reconfiguration cost for the contingency scenario can be determined. The reconfiguration cost can be determined utilizing one or more proprietary and/or traditional cost computational algorithms. In step 245, if the reconfiguration cost exceeds cost threshold, the method can return to step 225, else continue to step 250. In one instance, the cost threshold can be a time cost, a computing resource cost, a monetary cost, and the like. The cost threshold can be a numerical value, a non-numerical value (e.g., fuzzy logic value), and the like. For example, when the reconfiguration cost exceeds twenty percent processor utilization, the reconfiguration can be deemed too high. It should be appreciated that the cost threshold can be automatically adjusted during method 200 execution to permit accommodations for resource and/or service constraints.

In step 250, if there are more scenarios to be evaluated, the method can return to step 230, else continue to step 255. It should be appreciated that steps 230-250 can be iteratively performed to establish a suitable initial allocation in which the reconfiguration cost is below the cost threshold. In step 255, the candidate allocation can be established as an initial allocation for the resource. In step 260, a reconfiguration mapping can be generated utilizing initial allocations for each resource. In step 265, the reconfiguration mapping can be optionally presented. For example, the reconfiguration mapping can be presented as a network diagram within a user interface for manual review. In step 270, the method can end.

Drawings presented herein are for illustrative purposes only and should not be construed to limit the invention in any regard. It should be appreciated that the method can be performed in real-time or near real-time. The method can be performed in serial or in parallel. It should be understood that steps 225-245 can be repeated until a suitable candidate allocation is determined for a contingency scenario. It should be appreciated that the method 200 can be a portion of a strategic planning and/or resource configuration optimization process.

Figure 3:
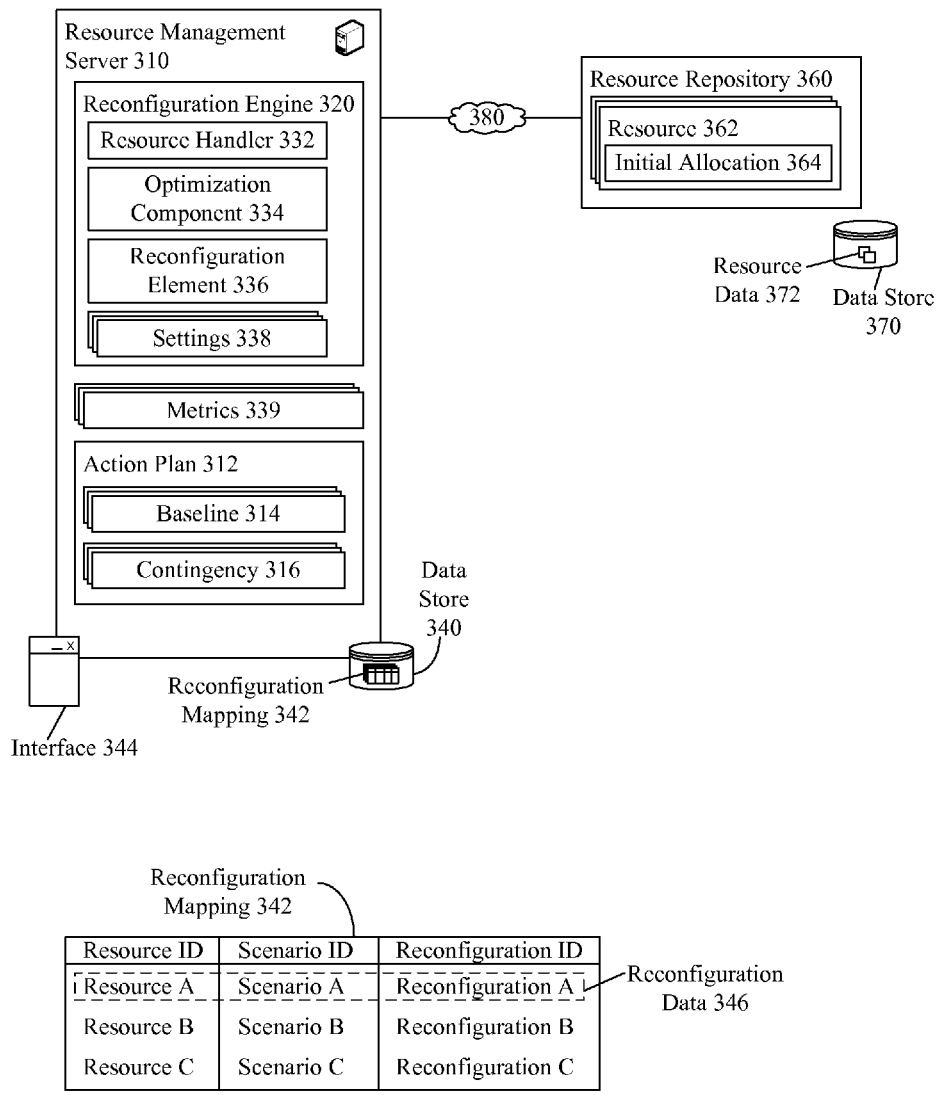
FIG. 3 is a schematic diagram illustrating a system for enhancing initial resource allocation management to provide robust reconfiguration in accordance with an embodiment of the inventive arrangements disclosed herein.

FIG. 3 is a schematic diagram illustrating a system for enhancing initial resource allocation management to provide robust reconfiguration in accordance with an embodiment of the inventive arrangements disclosed herein. System 300 can be performed in the context of example 100 and method 200. In system 300, a reconfiguration engine 320 can utilize reconfiguration mapping 342 to enable reduced reconfiguration costs of a resource 362 to accommodate contingency 314. In one instance, mapping 342 can support service level allocation optimization. In the instance, resource 362 reconfigurations can be determined for a service permitting an initial allocation to be established for the service. It should be appreciated that the disclosure minimizes reconfiguration costs by adjusting initial allocation 364 which can be heuristically determined. It should be understood that system 300 can represent one embodiment for performing the functionality of the disclosure and is not limited to the arrangements disclosed herein.

Resource management server 310 can be hardware/software element able to manage resource 362 within one or more scenarios. Server 310 can include, but is not limited to, reconfiguration engine 320, metrics 339, data store 340, interface 344, and the like. Server 310 functionality can include, but is not limited to, authentication, encryption, and the like. In one instance, server 310 can be a functional component of an enterprise resource planning (ERP) server. In one instance, server 310 can be a project management server of a software development infrastructure. In another instance, server 310 can be a human resource management component of a resource management framework.

Reconfiguration engine 320 can be a hardware/software component for determining an optimized reconfiguration setting for resource 362. Engine 320 can include, but is not limited to, resource handler 332, optimization component 334, reconfiguration element 336, setting 338, and the like. Engine 320 functionality can include, but is not limited to, resource leveling, presentity tracking, resource registration, workflow management, scheduling, resource tracking, collaboration function, document management, reporting, analysis, and the like. In one embodiment, engine 320 can be a component of an IBM WEBSPHERE software. In one instance, engine 320 can be a functionality of a software-as-a-service (SaaS) entity. For example, engine 320 capability can be accessed as a Web-based service.

Resource handler 332 can be a hardware/software entity for controlling resource 362. Handler 332 functionality can include, but is not limited to, resource identification, resource status, and the like. For example, handler 332 can query resource 362 status to determine resource availability. In one instance, handler 332 can obtain resource description information associated with the resource 362. For example, handler 332 can be utilized to automatically determine junctions with critical path properties. In the instance, resource description information can include, but is not limited to, resource identification, resource capacity, resource location, and the like. For example, handler 332 can be used to determine resource limitations which can produce service level constraints.

Optimization component 334 can be a hardware/software element able to determine an optimized initial allocation 364. Component 334 functionality can include, but is not limited to, scenario identification, scenario selection, resource configuration optimization, and the like. In one instance, optimization component 334 can include a minimization algorithm (e.g., algorithm 156). Component 334 can be utilized to determine reconfiguration overhead, including, but not limited to, reconfiguration costs, reconfiguration time, and the like. For example, component 334 can determine the geographic proximity of a resource to establish when a reconfiguration cost is too high. In one instance, component 334 can compute an initial allocation 364 for a resource 362.

Reconfiguration element 336 can be a hardware/software entity for determining a reconfiguration setting for resource 362. Element 336 functionality can include, scenario simulation, resource reconfiguration, initial allocation 364 actions, and the like. In one instance, element 336 can utilize an initial allocation 364 to determine one or more reconfiguration settings for a resource 362. In the instance, element 336 can simulate scenarios for each reconfiguration setting which can be analyzed by optimization component 334. For example, for an initial allocation of resource 362, element 336 can simulate multiple scenarios utilizing reconfiguration settings to determine an optimized initial allocation.

Settings 338 can be one or more rulesets for establishing the behavior of system 300 and/or engine 320. Settings 338 can include, but is not limited to, resource handler 332 options, optimization component 334 settings, reconfiguration element 336 options, and the like. In one embodiment, settings 338 can permit minimum levels associated with a service and/or resource which can be utilized to establish an appropriate reconfiguration mapping 342. Settings 338 can be manually and/or automatically established. In one instance, settings 338 can be presented within interface 344 which can permit manual configuration of settings 338. In another instance, settings 338 can be heuristically determined based on one or more non-heuristic settings.

Metrics 339 can be one or more measurements obtained from a scenario simulation. Metrics 339 can include, but is not limited to, performance metrics, software metrics, resource metrics, and the like. Metrics 339 can be collected during engine 320 and/or resource 362 operation. In one instance, metrics 339 can permit self-optimization of engine 320 operation. In the instance, metrics 339 can be analyzed and utilized to tune initial allocation 364 (e.g., feedback loop). For example, metrics obtained from baseline 312 can be used to determine resource 360 performance after reconfiguration. It should be appreciated that metrics 339 can be analyzed via one or more traditional and/or proprietary mechanisms.

Action plan 312 can be an artifact of a planning process associated with a resource and/or service. Action plan 312 can include, but is not limited to, a baseline 314, a contingency 316, and the like. Action plan 312 can conform to one or more traditional formats including, but not limited to, an Extensible Markup Language (XML) format, a plain text format, and the like. In one instance, action plan 312 can be a set of configuration settings associated with a baseline 314 and contingency 316.

Baseline 314 can be a data set which can be utilized as a datum for qualitative and/or quantitative analysis. Analysis can include, but is not limited to computation, comparison, and the like. Baseline 314 can be associated with a baseline scenario which can include one or more events linked to a normal operation of resource 362. Baseline 314 can include, but is not limited to, a baseline configuration, a baseline cost, a baseline performance, and the like. Baseline 314 can conform to one or more traditional and/or proprietary formats including, but not limited to, an Extensible Markup Language (XML) format, a plain text format, and the like.

Contingency 316 can be one or more data sets which can deviate from baseline 314. Deviation can include, but is not limited to, configuration, cost, performance, and the like. Contingency 316 can be associated with a contingency scenario which can include one or more events linked to an abnormal operation of resource 362. Contingency 316 can include, but is not limited to, a contingency configuration, a contingency cost, a contingency performance, and the like. Contingency 316 can conform to one or more traditional and/or proprietary formats including, but not limited to, an Extensible Markup Language (XML), a plain text format, and the like.

Data store 340, 370 can be a hardware/software component able to persist mapping 342, resource data 372, and the like. Data store 340, 370 can be a Storage Area Network (SAN), Network Attached Storage (NAS), and the like. Data store 340, 370 can conform to a relational database management system (RDBMS), object oriented database management system (OODBMS), and the like. Data store 340, 370 can be communicatively linked to server 310 in one or more traditional and/or proprietary mechanisms. In one instance, data store 340, 370 can be a component of Structured Query Language (SQL) complaint database.

Reconfiguration mapping 342 can be a data set able to specify a reconfiguration setting associated with a resource. Mapping 342 can include, but is not limited to, a resource identifier, a scenario identifier, a reconfiguration identifier, and the like. In one instance, mapping 342 can be presented within interface 344. In the instance, management actions can be enacted on mapping 342. For example, an administrator can perform manual optimizations to mapping 342 in response to metric 339 analysis. In one instance, mapping 342 can be stored within data store 340.

Interface 344 can be a user interactive component permitting interaction and/or presentation of mapping 342. Interface 344 can be present within the context of a Web browser application, a desktop application, and the like. In one embodiment, interface 344 can be a screen of an administrative screen. In the embodiment, interface 344 can present a contingency planning tool which can assist an administrator in establishing contingency scenarios which can be used produce an optimized initial allocation for a service. Interface 344 capabilities can include a graphical user interface (GUI), voice user interface (VUI), mixed-mode interface, and the like. In one instance, interface 344 can be communicatively linked to computing device.

Resource repository 360 can be a hardware/software entity able to manage resource 360. Repository 360 functionality can include, but is not limited to, resource 360 storage, resource 360 metadata collection, resource 360 federation, resource 360 proliferation, and the like. Repository 360 can include, but is not limited to, resource 362, data store 370, and the like. In one instance, repository 360 can be a concurrent versioning system capable repository.

Resource 362 can be a computational representation of a consumable item. For example, resource 362 can be a user profile associated with a human resource. Resource 362 can include, but is not limited to, initial allocation 364, metadata (e.g., resource data 372). Resource 362 can be a file, a data object, a database record, and the like. Initial allocation 364 can be a set of parameters for configuring resource 362 during nominal and/or initial operation. Initial allocation 364 can include, but is not limited to, configuration parameters, operational options, and the like.

Network 380 can be an electrical and/or computer network connecting one or more system 300 components. Network 380 can include, but is not limited to, twisted pair cabling, optical fiber, coaxial cable, and the like. Network 380 can include any combination of wired and/or wireless components. Network 380 topologies can include, but is not limited to, bus, star, mesh, and the like. Network 380 types can include, but is not limited to, Local Area Network (LAN), Wide Area Network (WAN), Virtual Private Network (VPN) and the like.

Drawing presented herein are for illustrative purposes only and should not be construed to limit the invention in any regard. In one embodiment, system 300 can conform to a Service Oriented Architecture. It should be appreciated that engine 320 components can include one or more optional components permitting the operation of engine 320 is retained. Engine 320 can be a networked computing element, a distributed computing element, and the like. System 300 can be a component of a networked computer environment, a distributed computing environment, a cloud-based computing infrastructure, and the like.

The flowchart and block diagrams in the FIGS. 1-3 illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

What is claimed is:

1. A method for reconfiguration aware initial allocation comprising:
   capturing, by a computer, a description of one or more resources associated with a service of an entity, wherein the service is associated with at least one of the one or more resources, a constraint, and a demand, wherein each of the one or more resources is associated with at least three characteristics comprising a utility, a limited availability, and a consumption rate, wherein the entity is at least one of an organization and a system;

formulating, by the computer using an algorithm, an initial allocation problem associated with the one or more resources as a two phase problem, wherein the first phase is an optimization problem and the second phase is a restricted allocation problem, wherein the initial allocation problem is associated with reconfiguring a previously established allocation of a baseline scenario; and solving, by the computer, the optimization problem to establish an allocation, wherein the favorable allocation minimizes the reconfiguration cost of the reconfiguring, wherein the baseline scenario is a normal operation of the service;

wherein a reconfiguration cost is a network utilization overhead associated with a session initiation setup; and wherein the initial allocation comprises a reconfiguration capable allocation of resources including an allocation associated with one or more resources and a metric; wherein the initial allocation decreases reconfiguration time of a service from approximately three minutes twenty seconds to approximately two minutes resulting in a time savings of approximately one minute twenty seconds; wherein the initial allocation reduces reconfiguration costs while maintaining a minimum level of service by service.

2. The method of claim 1, wherein the formulating the optimization problem is associated with a Centroid cost and a Median cost; and wherein the algorithm performs a minimization of the maximum cost or a minimization of the average cost corresponding to a Centroid cost and a Median cost;

wherein the algorithm establishes k types of resources for an organization; wherein each resource of type i has $N_i$ resources denoted by $T(i,N_i)$.

3. The method of claim 1, wherein the solving minimizes at least one of the maximum reconfiguration cost and the average reconfiguration cost; wherein the service is a Web service for handling Session Initiated Protocol communication having one or more demand points requiring service availability; and wherein the service is specified by a k-tuple and a set of constraints.

4. The method of claim 1, wherein the resource is at least one of an economic resource, a biological resource, a computer resource, a land management resource, and a human resource, wherein the computing is performed when the configuration cost is unknown;

wherein when a cost function is unknown, the algorithm determines a cost by the number of resources to be reallocated.

5. The method of claim 1, further comprising:
computing the reconfiguration of the service associated with the favorable allocation for a contingency scenario; and associating the reconfiguration with the service when at least one of a plurality of contingency scenarios occur.

6. The method of claim 1, further comprising:
presenting at least one of the baseline allocation and a contingency allocation within a user interface, wherein the baseline allocation is associated a baseline scenario, wherein the contingency allocation is associated with a contingency scenario.

7. The method of claim 1, wherein the presenting overlays the contingency allocation upon a graph of at least one of the entity, the service, and the resource.

8. The method of claim 1, wherein the solving utilizes a greedy heuristic.

9. The method of claim 1, wherein the service is at least one of a public service, a private service, and a computer service.

10. A system for reconfiguration aware initial allocation comprising:
at least one processor connected to at least one non-transitory storage medium;
a reconfiguration engine stored in the at least one non-transitory storage medium configured to cause the processor to establish an initial allocation associated with one or more resources of a service, wherein the initial allocation is associated with at least one of a reconfiguration setting and a reconfiguration cost, wherein the service is associated with at least one of the one or more resources, a constraint, and a demand, wherein the resource is associated with at least three characteristics comprising a utility, a limited availability, and a consumption rate, wherein the entity is at least one of an organization and a system; and
a data store configured to persist at least one of a reconfiguration mapping and an action plan associated with the service;
wherein the reconfiguration engine computes the configuration cost required to change service configuration from a contingency scenario to another contingency scenario; and
wherein the initial allocation comprise a reconfiguration capable allocation of resources including an allocation associated with one or more resources and a metric; wherein the initial allocation decreases reconfiguration time of a service from approximately three minutes twenty seconds to approximately two minutes resulting in a time savings of approximately one minute twenty seconds; wherein the initial allocation reduces reconfiguration costs while maintaining a minimum level of service by service.

11. The system of claim 10, further comprising:
a resource handler stored in the at least one non-transitory storage medium configured to cause the processor to identify the resource associated with the service and determine a resource description, wherein the resource description is at least one of a dependency information, an access information, and an availability information, wherein the resource handler automatically determines junctions with critical path properties and determine resource limitations that produce service level constraints;
an optimization component stored in the at least one non-transitory storage medium configured to cause the processor to determine the initial allocation for the resource; and
a reconfiguration element stored in the at least one non-transitory storage medium configured to cause the processor to determine at least one reconfiguration setting associated with the initial allocation of the resource;
wherein the action plan comprises a set of scenarios associated with a number of allocations wherein each scenario includes allocation information for each baseline scenario and/or contingency scenario and each allocation represents a computer configuration as an arrangement of functional units, including a computer file, a service, a computing resource, and a database record;

wherein the reconfiguration cost comprises a temporal cost, a resource cost, a human resource cost, and a monetary cost; and wherein the initial allocation comprises a portion of a reconfiguration mapping.

12. The system of claim 10, wherein the reconfiguration engine is associated with a minimization algorithm, wherein the minimization algorithm is configured to minimize the maximum reconfiguration cost.

13. The system of claim 10, wherein the reconfiguration engine is associated with a minimization algorithm, wherein the minimization algorithm is configured to minimize the average reconfiguration cost.

14. The system of claim 10, wherein the reconfiguration engine utilizes a greedy heuristic to solve an optimization problem associated with a reconfiguration of a resource associated with the service.

15. The system of claim 10, wherein the service is at least one of a public service, a private service, and a computer service.

16. The system of claim 10, wherein the reconfiguration engine determines the initial allocation when the reconfiguration cost associated with the service is unknown.

17. The system of claim 10, wherein the service is reconfigured utilizing a reconfiguration setting responsive to a disruption of the service, wherein the disruption is at least one of a planned event and an unplanned event.

18. A computer program product comprising a non-transitory computer readable storage medium having computer usable program code embodied therewith, the computer usable program code comprising:

computer usable program code stored in a non-transitory storage medium, executable a processor to capture a description of one or more resources associated with a service of an entity, wherein the service is associated with at least one of the one or more resources, a constraint, and a demand, wherein each of the one or more resources is associated with at least three characteristics comprising a utility, a limited availability, and a consumption rate, wherein the entity is at least one of an organization and a system;

computer usable program code stored in the non-transitory storage medium, executable by the processor to formulate an initial allocation problem associated with the resource as a two phase problem, wherein the first phase is an optimization problem and the second phase is a restricted allocation problem, wherein the initial allocation problem is associated with reconfiguring a previously established allocation of a baseline scenario; and computer usable program code stored in the non-transitory storage medium, executable by a processor to solve the optimization problem optimally or approximately to establish a favorable allocation, wherein the favorable allocation minimizes the reconfiguration cost of the reconfiguring, wherein the baseline scenario is a normal operation of the service;

wherein the reconfiguration engine computes the configuration cost required to change service configuration from a contingency scenario to another contingency scenario; and wherein the initial allocation comprises a reconfiguration capable allocation of resources including an allocation associated with one or more resources and a metric; wherein the initial allocation decreases reconfiguration time of a service from approximately three minutes twenty seconds to approximately two minutes resulting in a time savings of approximately one minute twenty seconds; wherein the initial allocation reduces reconfiguration costs while maintaining a minimum level of service by service.

19. The computer program product of claim 18, wherein the functionality of the computer program product is encapsulated within an Application Programming Interface;

wherein the action plan comprises a set of scenarios associated with a number of allocations wherein each scenario includes allocation information for each baseline scenario and/or contingency scenario and each allocation represents a computer configuration as an arrangement of functional units, including a computer file, a service, a computing resource, and a database record;

wherein the reconfiguration cost comprises a temporal cost, a resource cost, a human resource cost, and a monetary cost; and wherein the initial allocation comprises a portion of a reconfiguration mapping.

20. The computer program product of claim 18, wherein the functionality of the computer program product is encapsulated within a Software-as-a-Service.

* * * * *